United States Patent
King

(10) Patent No.: US 7,119,697 B2
(45) Date of Patent: Oct. 10, 2006

(54) HYDROGEN FIRE DETECTION SYSTEM & METHOD

(75) Inventor: John D. King, Roseville, MN (US)

(73) Assignee: Detector Electronics Corporation, Bloomington, MN (US)

( * ) Notice: Subject to any disclaimer, the term of this patent is extended or adjusted under 35 U.S.C. 154(b) by 181 days.

(21) Appl. No.: 10/913,276

(22) Filed: Aug. 6, 2004

(65) Prior Publication Data
US 2005/0195086 A1    Sep. 8, 2005

Related U.S. Application Data

(60) Provisional application No. 60/550,501, filed on Mar. 5, 2004.

(51) Int. Cl.
  *G08B 17/12*    (2006.01)
(52) U.S. Cl. .................. 340/578; 340/577; 340/511; 702/135
(58) Field of Classification Search ............ 340/578, 340/577, 508, 511, 522, 521; 702/134, 135, 702/130
See application file for complete search history.

(56) References Cited

U.S. PATENT DOCUMENTS

| | | | |
|---|---|---|---|
| 3,859,520 A * | 1/1975 | Hertzberg et al. | 250/226 |
| 4,220,857 A | 9/1980 | Bright | |
| 5,281,815 A | 1/1994 | Even-Tov | |
| 5,612,676 A | 3/1997 | Plimpton et al. | |
| 5,804,825 A * | 9/1998 | Schuler | 250/339.15 |
| 5,995,008 A * | 11/1999 | King et al. | 340/578 |
| 6,222,618 B1 * | 4/2001 | Hasson | 356/4.07 |

FOREIGN PATENT DOCUMENTS

| | | |
|---|---|---|
| EP | 0 588 753 A1 | 3/1994 |
| WO | WO 99/01723 | 1/1999 |
| WO | WO 00/41512 | 7/2000 |

OTHER PUBLICATIONS

Carlon, H., "Model for Infrared Emission of Water Vapor/Aerosol Mixtures," *Applied Optics*, vol. 10, No. 10, pp. 2297-2303 (Oct. 1971).

* cited by examiner

*Primary Examiner*—Daniel Wu
*Assistant Examiner*—Travis Hunnings
(74) *Attorney, Agent, or Firm*—Merchant & Gould P.C.

(57) ABSTRACT

To detect flames burning carbon-free hydrogen-bearing fuels, first, second, and third sensors sense first, second and third regions of an infrared water emission band, and generate first, second, and third signals. A processor generates an alarm when the sensors indicate flame. The first region low cut-off wavelength may be lower than the second region low cut-off wavelength. The third region high cut-off wavelength may be higher than the second region high cut-off wavelength. The combined regions may include nearly the entire water emission band. The processor may discriminate distances to flames using the sensor signals. A fourth sensor may sense moisture concentration, and the processor may discriminate distances based thereon. The regions may be defined such that for a fire, all three regions receive substantial energy, with second region to first region energy ratio less than 1:1 and a second region to third region energy ratio less than 1:1.

32 Claims, 8 Drawing Sheets

HYDROGEN FIRE DETECTION SYSTEM & METHOD

This application claims the benefit of U.S. Provisional Application Ser. No. 60/550,501, filed Mar. 5, 2004, and entitled HYDROGEN FIRE DETECTION SYSTEM AND METHOD. This application also incorporates in its entirety U.S. Pat. No. 5,995,008, issued Nov. 30, 1999, and entitled FIRE DETECTION METHOD AND APPARATUS USING OVERLAPPING SPECTRAL BANDS.

BACKGROUND OF THE INVENTION

The invention relates to an apparatus and method for detecting flames. More particularly, the invention relates to an apparatus and method for detecting flames by measuring at least three regions of infrared radiation emitted by water vapor that is produced as a product of combustion.

Flames emit electromagnetic radiation across a range of wavelengths. The precise wavelengths may vary from flame to flame, depending on variables such as the fuel being burned. Conventional optical flame detectors operate by sensing one or more wavelengths of electromagnetic radiation.

Many combustible materials include carbon, and combustion of such fuels typically generates hot carbon dioxide. Hot carbon dioxide has a characteristic infrared emission spectrum, with a relatively strong and well-defined peak at wavelengths from approximately 4.2 to approximately 4.5 microns, and relatively little intensity at wavelengths immediately on either side of the peak.

An exemplary representation of an infrared emission spectrum including such a peak for carbon dioxide is shown in FIG. 1. The shape of the emission spectrum, including the precise wavelength of the maximum intensity, may vary somewhat depending on factors such as the type of fuel(s) burned, etc. However, regardless of its precise shape, this peak typically exhibits relatively strong emissions with relatively weak emissions immediately to either side.

For purposes of simplicity, this infrared carbon dioxide emissions peak is sometimes referred to herein as "the 4.4 micron peak", although as noted the exact wavelengths included in the peak will not necessarily be limited only to 4.4 microns.

Such a peak enables convenient analysis of the infrared radiation in conventional devices. For example, a conventional flame detector might be sensitive to a band of infrared radiation aligned with the carbon dioxide emission peak. A high intensity signal in that band could be interpreted as an indication of the presence of hot carbon dioxide, and thus may be considered indicative of a flame.

The 4.4 micron carbon dioxide peak also facilitates simple comparisons of peak to non-peak signals in conventional devices. For example, a slightly different conventional flame detector might be sensitive to a band of infrared radiation centered on the peak itself, and also to a "side band" of infrared radiation near but not at the peak. In the presence of an actual fire, the radiation intensity in the peak band generally is high, while little or no radiation is received in the side band. Thus, high radiation intensity in the peak band as compared to that in the non-peak side band might be used to determine whether the peak, and perhaps a flame, is present.

However, not all flames generate significant quantities of carbon dioxide. Some fuels lack carbon altogether, and thus do not produce carbon dioxide when burned. Exemplary carbon-free fuels include, but are not limited to, molecular hydrogen ($H_2$), ammonia ($NH_3$), arsine ($AsH_3$), and silane ($SiH_4$). Since burning these fuels does not produce carbon dioxide, sensing the characteristic infrared emission spectrum of carbon dioxide will not be a reliable approach for detecting such flames.

Attempts have been made to produce a flame detector that is sensitive to flames burning carbon-free fuels.

For example, the infrared radiation emitted by flames is not limited only to the characteristic radiation of hot carbon dioxide. For example, many fuels comprising hydrogen (including some fuels that also comprise carbon) produce water vapor when burned. Like carbon dioxide, water vapor has a characteristic infrared emission spectrum. The water emission spectrum extends from approximately 2.3 microns to 3.5 microns. Flames may also emit radiation at many other infrared wavelengths. Some conventional detectors sense portions of the infrared spectrum other than the 4.4 micron carbon dioxide peak.

However, the infrared emission spectra produced by burning carbon-free fuels typically is different from the infrared emission spectra produced by burning carbon-bearing fuels. As noted, carbon bearing fuels typically produce carbon dioxide, and their emission spectra thus typically exhibit the 4.4 micron carbon dioxide peak. However, the emission spectra of carbon-free fuels, which due to their lack of carbon do not generate significant quantities of carbon dioxide, typically do not exhibit the 4.4 micron carbon dioxide peak. Moreover, the emission spectra of carbon-free fuels may not exhibit any other similarly well-defined peak that might be analyzed in a similar conventional manner.

As differentiated from the carbon dioxide peak, much of the infrared spectra for flames burning many fuels (both carbon-bearing and carbon-free) is in the form of broad emission bands, small individual peaks of relatively low intensity, or tightly spaced groups of peaks. For example, an infrared emission spectrum for water vapor is shown in FIG. 2. As may be seen therein, no strong peak or other clear marker is readily visible. A magnified view of a portion of the infrared water emission spectrum is shown in FIG. 3. Although peaks may be seen therein, those peaks are many in number, and tightly spaced. In addition, many of those peaks are of at least roughly comparable height. Given such an emission spectrum, conventional analysis of a single peak may prove difficult.

Although much of the infrared spectrum may vary depending on variables such as the type of fuel being burned, certain bands of the infrared spectrum may be emitted with some consistency from a variety of flames. For example, flames burning fuels that include hydrogen generally produce hot water vapor as a combustion product, and their infrared emission spectra typically include a water emission band. However, conventional analysis of those portions of the infrared flame spectrum has not provided a reliable indication of the presence of flames, and/or has not reliably excluded false alarm sources.

As noted above, flame detection conventionally relies on measurements of radiation in a band associated with a peak, with low intensity areas immediately to either side. However, with closely spaced peaks as shown in FIGS. 2 and 3, defining areas of low intensity to either side of a particular peak may be difficult. In order to select only one peak from a group of many closely spaced peaks in a spectrum similar to that shown in FIGS. 2 and 3, some means of limiting the radiation detected to a very narrow band would be required. As may be seen from FIG. 1, a bandwidth of 0.1 or 0.2 microns might be suitable to isolate the 4.4 micron carbon dioxide peak. However, as may be seen from FIG. 3, isolating one of the peaks therein might require a bandwidth as small as 0.001 microns. Even if achieving such a narrow bandwidth is possible, it may be impractical.

In addition, any such band would have to be aligned to the selected peak with a very high degree of precision. If the peak to be sensed is only 0.001 microns wide, a misalignment of 0.001 microns might be enough to miss the peak entirely. Again, assuming a design is available to provide such precision in aligning the band to sense a peak such as those in FIG. 3, it may not be practical to manufacture.

Furthermore, the use of conventional optics changes the apparent wavelength of incident radiation. If the radiation is at least approximately normal to the surfaces of the optics, the apparent change in wavelength may be small. However, for incident radiation striking at an off-axis angle of 45 degrees, the apparent wavelength of the incident radiation may decrease by as much as 2 or 3 percent. Considering the peak shown at approximately 2.82 microns in FIG. 3, a 2 percent variation would be approximately 0.06 microns. This variation is many times the 0.001 micron bandwidth discussed above.

Thus, even if a filter or other selector can be made with a suitably small bandwidth and a suitably precise pass band, a conventional approach to flame detection using a water emission band (or a band similarly lacking in readily isolated peaks) still would face significant obstacles to success in detecting actual flames.

In addition, infrared radiation with spectra at least superficially similar to those emitted by flames is produced by many non-flame sources, including but not limited to warm objects (including under some circumstances people or animals), sunlight, and various forms of artificial lighting. Infrared radiation from these sources may be misinterpreted as a flame, thus producing a false alarm condition. However, simply ignoring or filtering the radiation to exclude false alarms from such non-flame sources may result in actual flames being masked.

Absent a strong peak or other well-defined marker, attempts have been made conventionally to distinguish flames from false alarm sources by sensing wavelengths to identify the relative shape of an infrared signal overall, rather than keying off of a particular characteristic feature. For example, many false alarm sources have infrared spectra resembling a blackbody curve, but actual soot-free fires generally do not.

Conventionally, however, it may be difficult to determine reliably whether the overall shape of an infrared signal, particularly one that is broadly distributed in terms of wavelength, and/or of relatively low intensity, is representative of a fire or a false alarm source.

Conventionally, when attempting to identify differences in the shape of an overall spectrum, wavelengths are considered that show plainly visible changes intensity between flames and false alarm sources.

However, such an arrangement is not necessarily sufficient to distinguish between an actual fire and a false alarm. Many wavelengths that exhibit variations in strength between false alarms and fires also exhibit variations for different types of false alarms, and/or different types of fires.

In addition, the overall shape of the spectrum of infrared radiation emitted by false alarm sources also may vary. Thus, a ratio of two given wavelengths may vary considerably for differing false alarm sources.

For example, the amount of radiation emitted at different wavelengths may vary considerably, depending on the temperature or other properties of the false alarm source.

Even if all false alarm sources are assumed to be simple blackbody radiators (which may not necessarily be the case), the temperatures of those blackbodies may vary dramatically. The sun has an effective blackbody temperature of approximately 5800 Kelvin, while objects near room temperature have blackbody temperatures of approximately 300 Kelvin.

Thus, the ratio of signal strength at two given wavelengths may have a range of values, whether the source of the infrared radiation is a flame or a false alarm source. Consequently, such an arrangement may not be sufficient to reliably distinguish flames from false alarms.

If the shape of an infrared signal is mapped out in greater detail, for example by increasing the number of infrared wavelengths for which signal intensity is measured, this may at least in principle enable greater confidence in determining whether a signal is from a real fire or a false alarm source. However, increasing the number of monitored bands can increase the complexity of a detector. For example, as the number of wavelengths monitored increases, more sensors, filters, lens systems, etc. are needed. Also, as the number of individual wavelengths considered increases, the amount of processing power required also may increase.

In summary, using conventional approaches for infrared sensing of flames from carbon-free fuels may pose difficulties with regard to accurate detection of flames, reliability in rejecting false alarms, and complexity.

It is known to rely on wavelengths other than infrared when attempting to detect flames from carbon-free fuels. However, conventional approaches for sensing ultraviolet and/or visible radiation from flames burning carbon-free fuels may pose similar difficulties to those described with regard to the conventional sensing of infrared radiation.

Some carbon-free fuels, such as molecular hydrogen, emit ultraviolet radiation when burned. Some conventional flame detectors rely on this ultraviolet radiation in order to identify the presence of carbon-free fuel flames.

However, for many fuels the ultraviolet emission spectrum is weak and/or spread out. Instead of exhibiting a strong, well-defined emission peak, ultraviolet spectra for flames may consist of broad, low-intensity emission bands or many small, closely grouped peaks.

As noted above, the lack of a strong infrared peak poses difficulties for conventional infrared detectors. The lack of a well-defined ultraviolet peak presents similar difficulties for ultraviolet detectors.

In addition, as with conventional infrared detectors, false alarms are also a concern with ultraviolet flame detectors. Ultraviolet radiation with wavelengths similar to those emitted by flames is produced by many non-flame sources, including but not limited to electrical equipment, electrical discharges such as those associated with arc welding and lightning, and coronal discharges such as those from power lines.

In addition, certain gases absorb ultraviolet energy. In particular, certain hydrocarbons readily absorb ultraviolet radiation. The presence of hydrocarbon vapors may be expected in applications such as petroleum drilling, refining, and storage. Indeed, the presence of such vapors may serve as a stimulus to provide flame detection capability. However, those vapors may absorb ultraviolet radiation that is relied upon by some conventional flame detectors. Consequently, the vapors themselves may interfere with conventional flame detection, and/or false alarm exclusion.

Sensing visible light also has been considered for detecting carbon-free fuel flames. As is well-known, certain flames emit visible light. However, many carbon-free fuels emit only minimal amounts of visible radiation. In particular, molecular hydrogen is notoriously difficult to identify in visible light. The visible light spectra for such fires tend to have relatively weak signals, with few if any well defined peaks.

Also, as with infrared and ultraviolet radiation, visible light similar to light that may be emitted by flames also is emitted by many non-flame sources, such as sunlight, incandescent lamps, fluorescent lights, etc.

It has been known to combine infrared detection with ultraviolet detection and/or visible light detection. However, such combinations conventionally may suffer from limitations similar to those of their individual spectra. For example, a conventional UV-IR flame detector may be unable to detect ultraviolet light in the presence of hydrocarbons; if ultraviolet radiation is relied upon by that detector in order to identify a fire and/or exclude false alarm sources, the lack of that ultraviolet radiation at the detector due to the presence of hydrocarbons may interfere with the detector's operation.

Thus, conventional approaches for using visible light to reliably detect carbon-free flames while avoiding false alarms also may be problematical.

Even for burning fuels that include carbon, and that emit hot carbon dioxide, conventional reliance on the carbon dioxide peak at 4.4 microns may pose difficulties in at least some circumstances.

For example, contaminants that affect the transmission of radiation in the 4.4 micron emission band are of concern.

One such potential contaminant is cool carbon dioxide. Cool carbon dioxide readily absorbs the infrared radiation emitted by hot carbon dioxide. Thus, the presence of significant amounts of cool carbon dioxide may reduce the apparent intensity of radiation at 4.4 microns. This may reduce the sensitivity of conventional carbon dioxide spectrum flame detectors.

It is noted that cool carbon dioxide is widely used as a fire suppressant. As such, it may be deliberately present in high concentrations when a fire is or is believed to be present. However, the very act of suppressing that fire may effectively "blind" conventional carbon dioxide spectrum flame detectors in the vicinity. In such circumstances, it might be difficult to determine whether the fire is extinguished or is still burning without clearing the area of the carbon dioxide fire suppressant.

Moreover, conventional carbon dioxide spectrum infrared flame detectors may have at best limited facility for discriminating between distant fires and fires within the area they are tasked to protect. With conventional carbon dioxide spectrum infrared flame detectors it may be difficult to distinguish between a flame that is present in a monitored area, and thus represents a potential hazard, and a flame that is far from the monitored area.

For example, petroleum drilling and processing facilities often have large stack fires or "flares" that burn off hydrocarbon gas. Typically, such hydrocarbon fires emit infrared radiation characteristic of hot carbon dioxide, including the peak at 4.4 microns. Stack flares typically represent known phenomena, and generally are not considered a legitimate alarm source.

However, stack flares often are visible for miles. It may be difficult to distinguish with a conventional carbon dioxide spectrum infrared flame detector between a distant stack flare and a potentially hazardous flame nearby. Thus, if a stack flare is within the field of view of a conventional carbon dioxide spectrum infrared flame detector, the conventional detector may trigger an alarm condition based on the presence of a 4.4 micron signal from the stack flare, even if the stack flare (or other fire) is far outside the desired area to be protected.

SUMMARY OF THE INVENTION

It is the purpose of the claimed invention to overcome these difficulties, thereby providing an improved apparatus and method for detecting flames, including but not limited to flames burning carbon-free fuels, and more particularly carbon-free, hydrogen-bearing fuels.

An apparatus in accordance with the principles of the present invention for detecting flame includes first, second, and third sensors, sensitive to first, second, and third regions of a characteristic infrared water emission band. The first, second, and third sensors generate first, second, and third signals respectively, those signals being representative of infrared radiation in first, second, and third regions respectively. The apparatus also includes a processor in communication with the sensors so as to receive the first, second and third signals. When the first, second, and third signals are indicative of flame, the processor generates an alarm signal.

At least two of the first, second, and third regions may have at least a portion of water emission band in common with one another, so that those regions at least partially overlap one another.

More particularly, the first region may include at least a portion of the second region, wherein the low cut-off wavelength of the first region is lower than the low cut-off wavelength of the second region. Likewise, the third region may include at least a portion of the second region, wherein the high cut-off wavelength of the third region is higher than the high cut-off wavelength of the second region.

The high cut-off wavelength of the first region may correspond at least approximately with the high cut-off wavelength of the second region. Likewise, the low cut-off wavelength of the third region may correspond at least approximately with the low cut-off wavelength of the second region. These cut-offs may correspond to within 50% of the bandwidth of the second region. They may correspond to within 15% of the bandwidth of the second region. They may correspond to within 5% of the bandwidth of the second region.

The combination of the first, second, and third regions may include at least 50% of the characteristic infrared water emission band. The combination of the first, second, and third regions may include at least 85% of the characteristic infrared water emission band. The combination of the first, second, and third regions may include at least 95% of the characteristic infrared water emission band.

Flames detected by the apparatus may include flames that burn at least substantially carbon-free, hydrogen-bearing fuel.

The first, second, and third sensors may be insensitive to the presence of carbon dioxide between the sensors and the flame.

The first, second, and third sensors may be insensitive to the presence of hydrocarbon vapors between the sensors and the flame.

The processor may discriminate distance to the flame based on the first, second, and third signals.

The processor may discriminate distance to the flame based on the first, second, and third signals and a fourth signal representative of the concentration of moisture between the apparatus and the flame.

The apparatus may include a fourth sensor sensitive to moisture between the fourth sensor and the flame, the fourth sensor generating the fourth signal, and being in communication with the processor.

The processor may not generate the alarm signal based on the distance to the flame.

The first, second, and third regions may be defined such that for a fire, the ratio of energy in the second region to energy in the first region is less than 1:1, and the ratio of energy in the second region to energy in the third region is less than 1:1.

A method of detecting flame in accordance with the principles of the present invention includes detecting infrared radiation in first, second, and third regions of a characteristic infrared water emission band. The method also includes determining the presence of a flame from the relative intensities of the infrared radiation in the first, second, and third regions.

At least two of the first, second, and third regions may have at least a portion of the characteristic infrared water emission band in common with one another, such that those regions at least partially overlap one another.

The first region may include at least a portion of the second region, the low cut-off wavelength of the first region being lower than the low cut-off wavelength of the second region. Likewise, the third region may include at least a portion of the second region, the high cut-off wavelength of the third region being higher than the high cut-off wavelength of the second region.

The high cut-off wavelength of the first region may correspond with the high cut-off wavelength of the second region. Likewise, the low cut-off wavelength of the third region may correspond with the low cut-off wavelength of the second region. The cut-off wavelengths may correspond to within 50% of the bandwidth of the second region. The cut-off wavelengths may correspond to within 15% of the bandwidth of the second region. The cut-off wavelengths may correspond to within 5% of the bandwidth of the second region.

The combination of the first, second, and third regions may include at least 50% of the characteristic infrared water emission band. The combination of the first, second, and third regions may include at least 85% of the characteristic infrared water emission band. The combination of the first, second, and third regions may include at least 95% of the characteristic infrared water emission band.

Flames to be detected may include flames burning fuel that is hydrogen-bearing and substantially carbon-free, and/or flames that are soot-free.

The method may include discriminating distance to the flame using the infrared radiation in the first, second, and third regions.

The method may include determining the concentration of moisture along an optical path to the flame, wherein the distance to the flame is discriminating using the infrared radiation in the first, second, and third regions and the moisture concentration.

The first, second, and third regions may be defined such that for a fire, the ratio of energy in the second region to energy in the first region is less than 1:1, and the ratio of energy in the second region to energy in the third region is less than 1:1.

A method of discriminating distance to a flame in accordance with the principles of the present invention includes detecting infrared radiation in first, second, and third regions of a characteristic infrared water emission band, and discriminating distance to the flame using relative intensities of infrared radiation in the first, second, and third regions.

The method may include determining the concentration of moisture along an optical path to the flame, wherein the distance to the flame is discriminated using the infrared radiation in the first, second, and third regions and the moisture concentration.

BRIEF DESCRIPTION OF THE DRAWINGS

Like reference numbers generally indicate corresponding elements in the figures.

DETAILED DESCRIPTION OF THE PREFERRED EMBODIMENT

Figure 4:
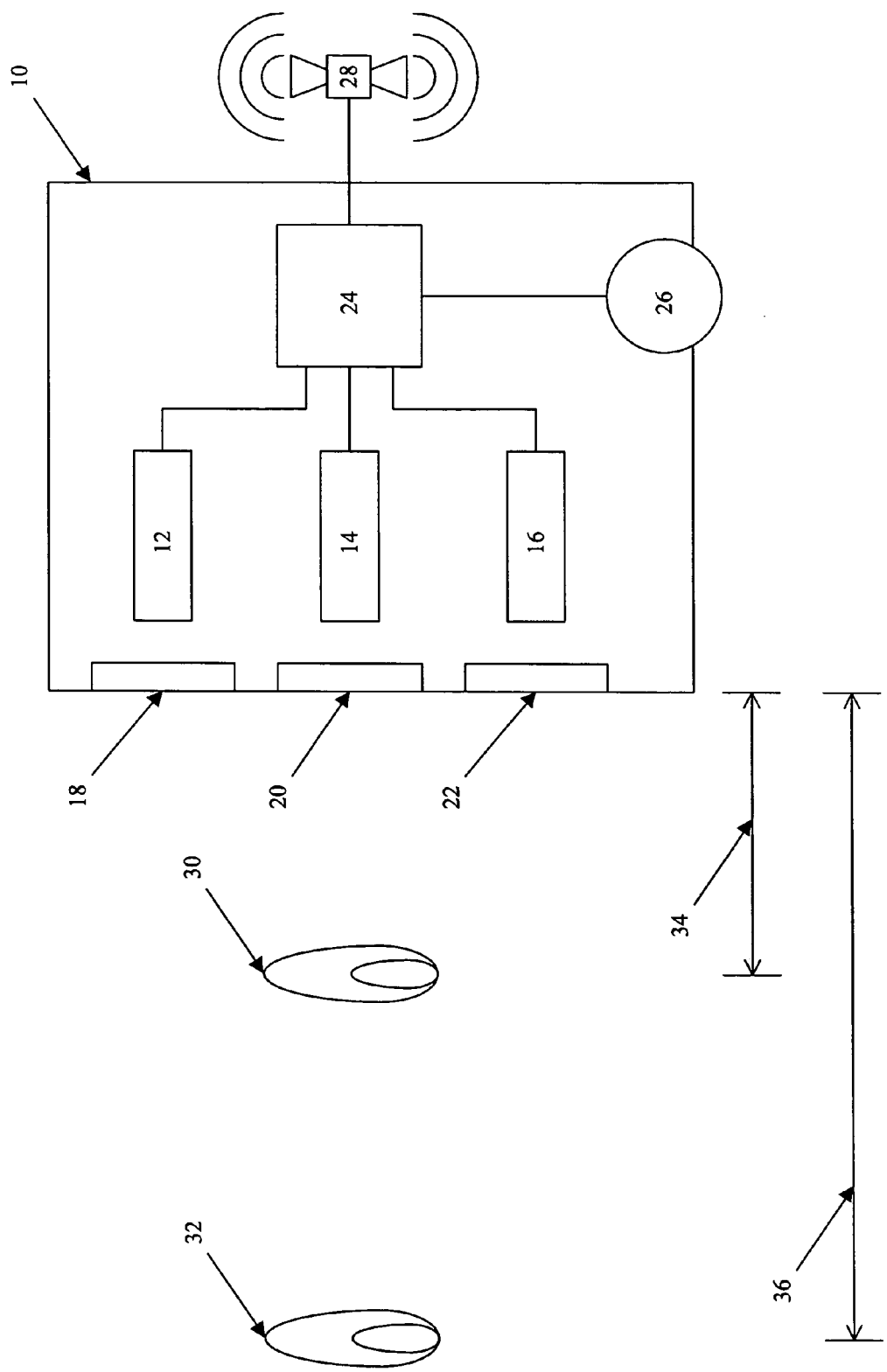
FIG. 4 illustrates an exemplary embodiment of a flame detector in accordance with the principles of the present invention, in schematic form.

Referring to FIG. 4, an exemplary embodiment of an apparatus 10 for detecting flames in accordance with the principles of the claimed invention includes a first sensor 12, a second sensor 14, and a third sensor 16.

As previously noted, hot water, such as in the form of vapor, emits a characteristic spectrum of infrared radiation. Each of the first, second, and third sensors 12, 14, and 16 is sensitive to a region of an emission band in the characteristic spectrum of infrared radiation associated with hot water.

For exemplary purposes, the water emission band referred to herein is considered to be the range of infrared wavelengths extending from approximately 2.3 microns to approximately 3.5 microns, inclusive. This band is illustrated in FIG. 2, and a portion thereof is illustrated in FIG. 3.

However, this definition is exemplary only. Other ranges of wavelengths may be equally suitable for consideration as an infrared emission band for water. For example, for some embodiments the upper and lower limits of the band as specified above may be different from the particular exemplary values indicated herein. However, unless otherwise specified, for purposes of discussion herein the emission band may be assumed to be 2.3 to 3.5 microns.

The first sensor 12 is sensitive to a first region 112 of the infrared spectrum, including at least a portion of the infrared water emission band. The second sensor 14 is sensitive to a second region 114 of the infrared spectrum, also including at least a portion of the infrared water emission band. The third sensor 16 likewise is sensitive to a third region 116 of the infrared spectrum, including at least a portion of the infrared water emission band The wavelength ranges of the three regions 112, 114, and 116 to which the sensors are sensitive are defined in such a fashion that analysis of the relative intensities of infrared radiation within those regions provides a reliable indication of the presence of fire, while also reliably excluding common false alarm sources. Certain specific wavelength ranges for the first, second, and third regions 112, 114, and 116 that have been determined to provide this functionality are described herein. However, the specific wavelength ranges noted herein are exemplary only. Wavelength ranges other than those specifically described herein may be equally suitable.

Figure 1:
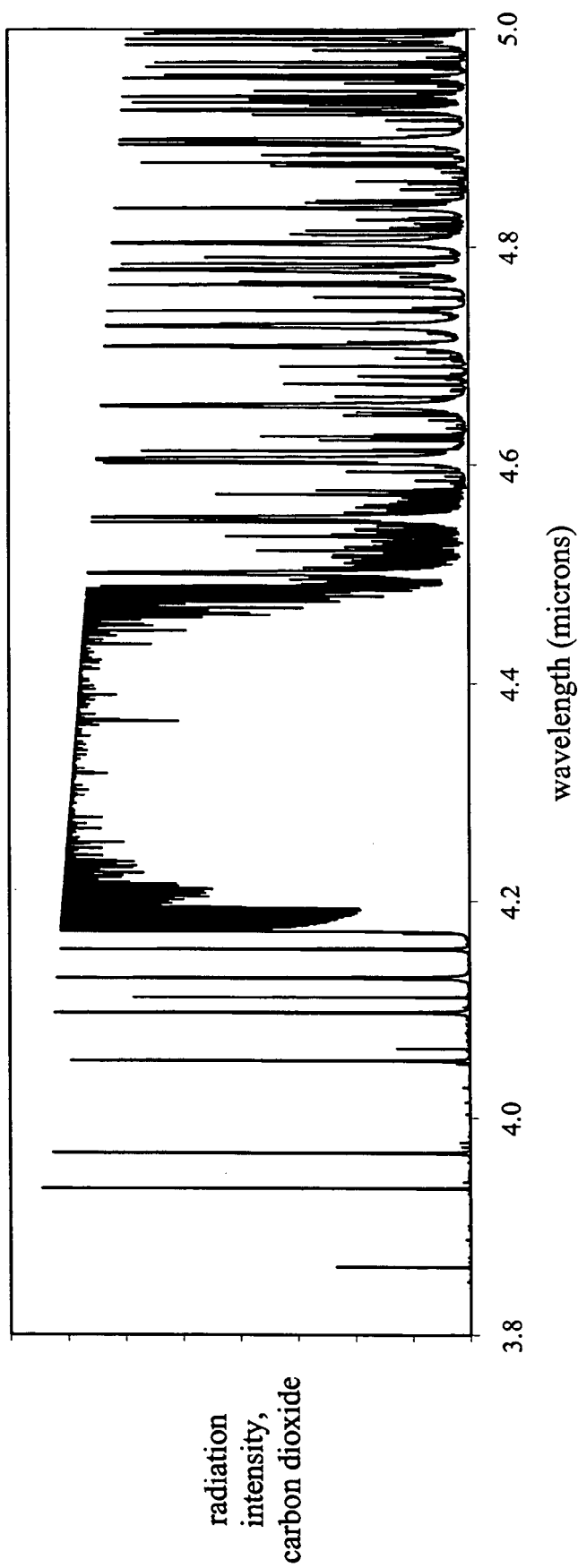
FIG. 1 illustrates a portion of an exemplary infrared emission spectrum for a carbon-bearing fuel flame, as known from the prior art.
Figure 2:
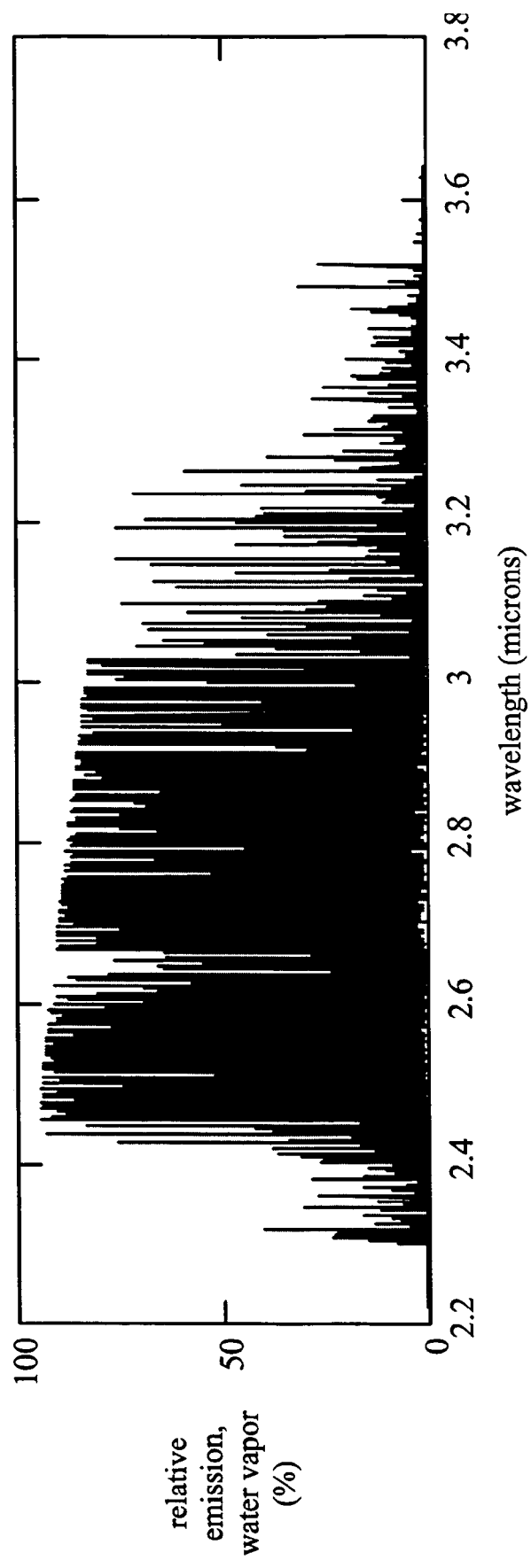
FIG. 2 illustrates a portion of an exemplary infrared emission spectrum for a flame burning hydrogen, as known from the prior art.
Figure 3:
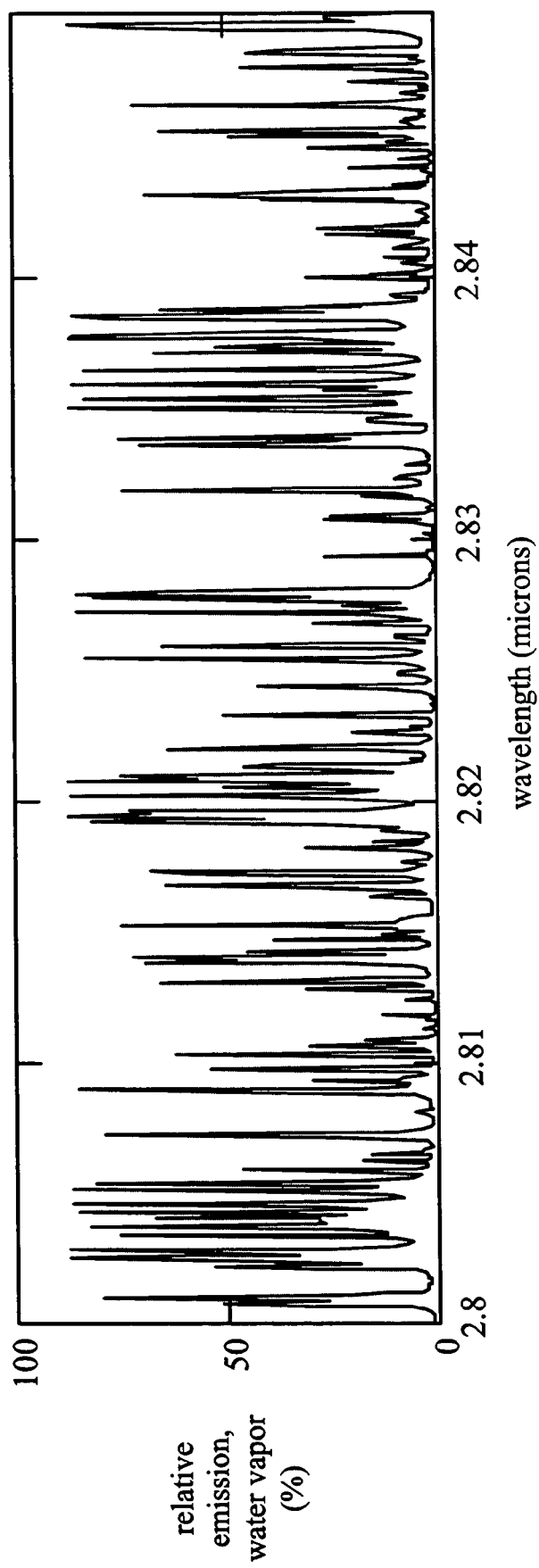
FIG. 3 illustrates a magnified portion of the spectrum in FIG. 2, as known from the prior art.
Figure 5:
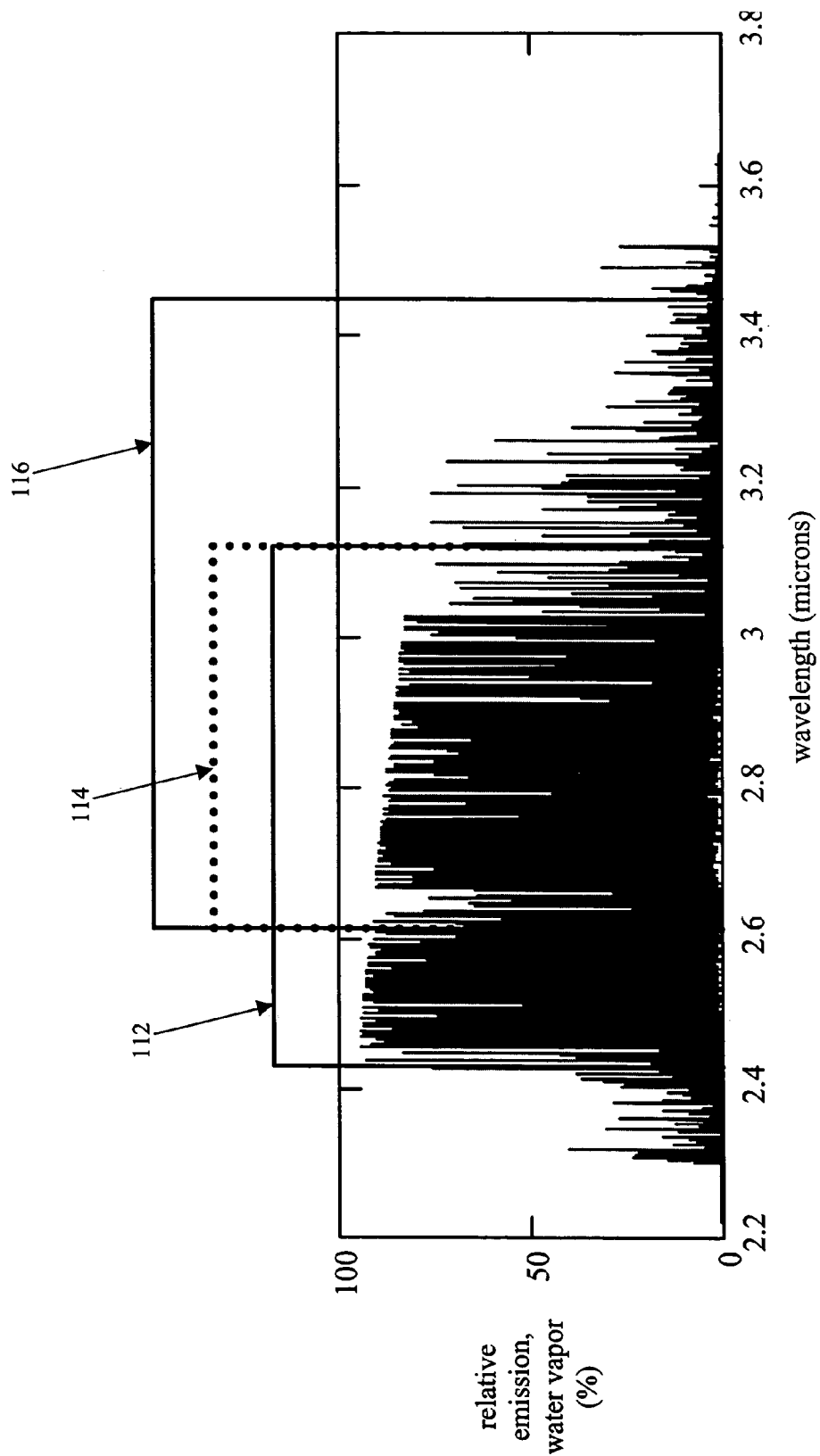
FIG. 5 illustrates an exemplary arrangement of first, second, and third regions in accordance with the principles of the present invention.

An exemplary arrangement of the first, second, and third regions 112, 114, and 116 is shown in FIG. 5, overlaid onto an infrared emission spectrum for water vapor similar to that shown in FIG. 2.

As previously indicated, the infrared emission spectrum for water as shown in FIG. 2 is known per se. However, it is emphasized that this applies only to the spectrum itself; no admission or suggestion is made or implied herein that a method or apparatus for flame detection by sensing regions of that infrared spectrum in accordance with the principles of the present invention is known. Likewise, the inclusion of that known spectrum from FIG. 2 in FIG. 5 should not be considered to be an indication that invention as described with reference to FIG. 5 is known.

In the exemplary embodiment shown in FIG. 5, the first region 112 is defined with a low cut-off wavelength of 2.427 microns, and a high cut-off wavelength of 3.120 microns. The second region 114 is defined with a low cut-off wavelength of 2.618 microns, and a high cut-off wavelength of 3.120 microns. The third region 116 is defined with a low cut-off wavelength of 2.618 microns, and a high cut-off wavelength of 3.442 microns.

The precise low and high cut-off wavelengths for the first, second, and third regions 112, 114, and 116 may vary considerably from embodiment to embodiment. Likewise, the overall bandwidth of each of the first, second, and third regions 112, 114, and 116 may vary.

However, in certain embodiments, the cut-off wavelengths may be within 20% of those shown in FIG. 5, and described with respect thereto. In other embodiments, the cut-off wavelengths may be within 10% of those shown in FIG. 5. In still other embodiments, the cut-off wavelengths may be within 5% of those shown in FIG. 5. In yet other embodiments, the cut-off wavelengths may be within 2.5% of those shown in FIG. 5. Moreover, in certain embodiments the cut-off wavelengths may be within 1% of those shown in FIG. 5.

With regard to bandwidth of the first, second, and third regions 112, 114, and 116, as previously noted, conventional detection of flames using infrared emissions from carbon dioxide generally relies on detection of a relatively high intensity infrared peak, with low intensity areas on either side.

By contrast, the present invention does not require isolation of one particular peak, or even of several discrete peaks. Rather, wavelength regions are sensed, wherein region may have substantial signal strength therein, but wherein it is not necessary for any or all of the regions to isolate a particular peak. The infrared emissions in those regions are evaluated for characteristics that signify the presence of a fire.

It is preferable that the first, second, and third regions 112, 114, and 116 each are sufficiently wide as to include multiple peaks. In other words, it is preferable for the first, second, and third regions 112, 114, and 116 to be broad as compared to the width of adjacent peaks within those regions of the water emission band, and/or the spacing between those peaks.

The precise widths of the first, second, and third regions 112, 114, and 116, that is, the range of wavelengths included within each, may vary. However, it is preferable that the high and low cut-off wavelengths for each of the first, second, and third regions 112, 114, and 116 differ by more than 0.3 microns.

In some embodiments, it is preferable that the high and low cut-off wavelengths for each of the first, second, and third regions 112, 114, and 116 differ by more than 0.4 microns.

In other embodiments, it is preferable that the high and low cut-off wavelengths for each of the first, second, and third regions 112, 114, and 116 differ by more than 0.5 microns.

The first, second, and third regions 112, 114, and 116 are defined such that each of the first, second, and third regions 112, 114, and 116 receives significant infrared energy from an actual fire. In other words, the first, second, and third regions 112, 114, and 116 are not defined so as to produce an arrangement with a strong central band and weak side bands. Rather, all three regions 112, 114, and 116 receive substantial amounts of energy.

More particularly, it is preferable that for an actual fire signal, the ratio of energy in the second region to energy in the first region is less than 1:1. It likewise is preferable that the ratio of energy in the second region to energy in the third region is less than 1:1.

In certain embodiments, it may be preferable that for an actual fire, the ratio of energy in the second region to energy in the first region is less than 2:3. It likewise may be preferable that the ratio of energy in the second region to energy in the third region is less than 2:3.

Moreover, it may be preferable that for an actual fire, the ratio of energy in the second region to energy in the first region is less than 1:2. It likewise may be preferable that the ratio of energy in the second region to energy in the third region is less than 1:2.

Figure 6:
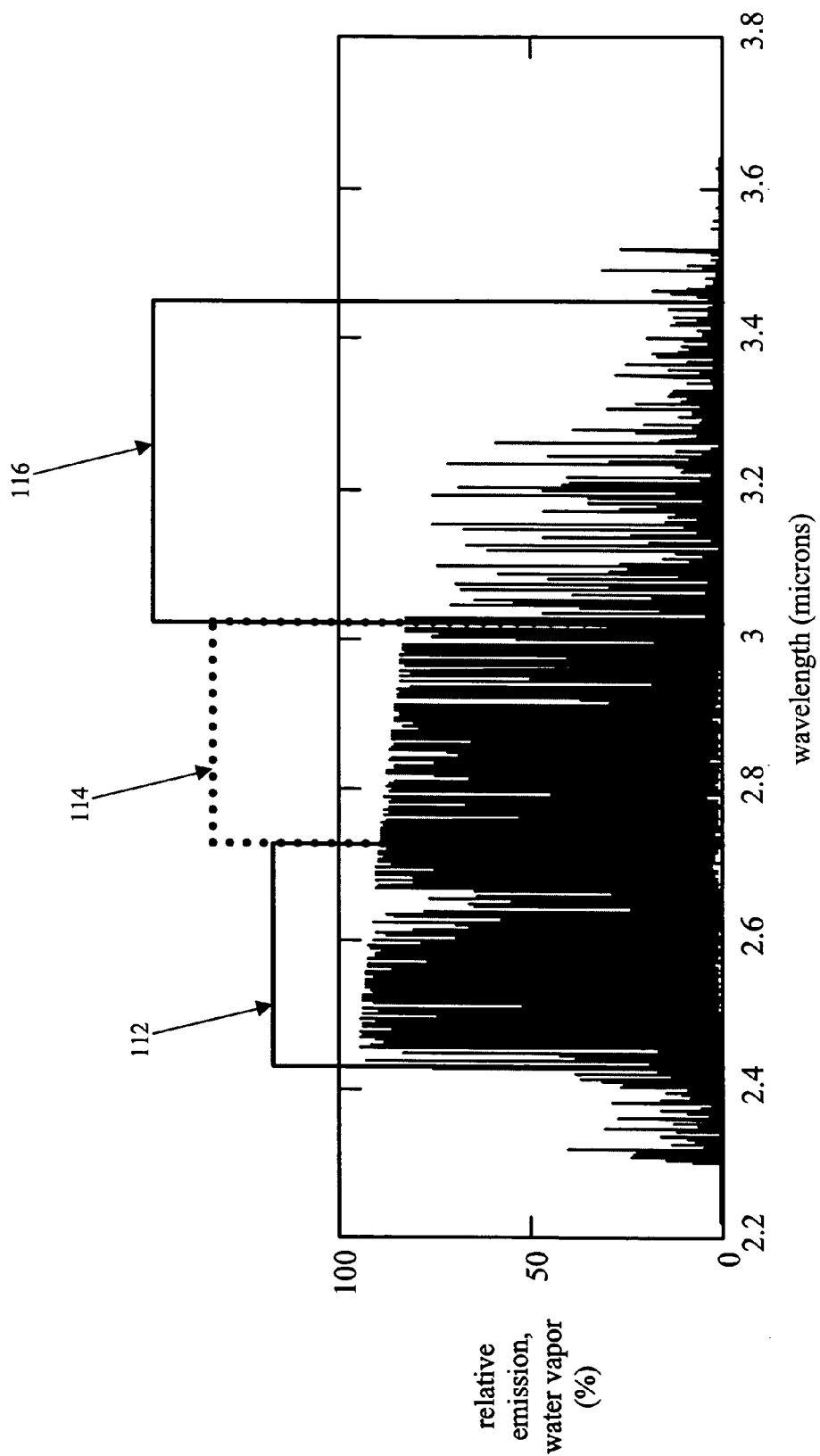
FIG. 6 illustrates another exemplary arrangement of first, second, and third regions in accordance with the principles of the present invention.
Figure 7:
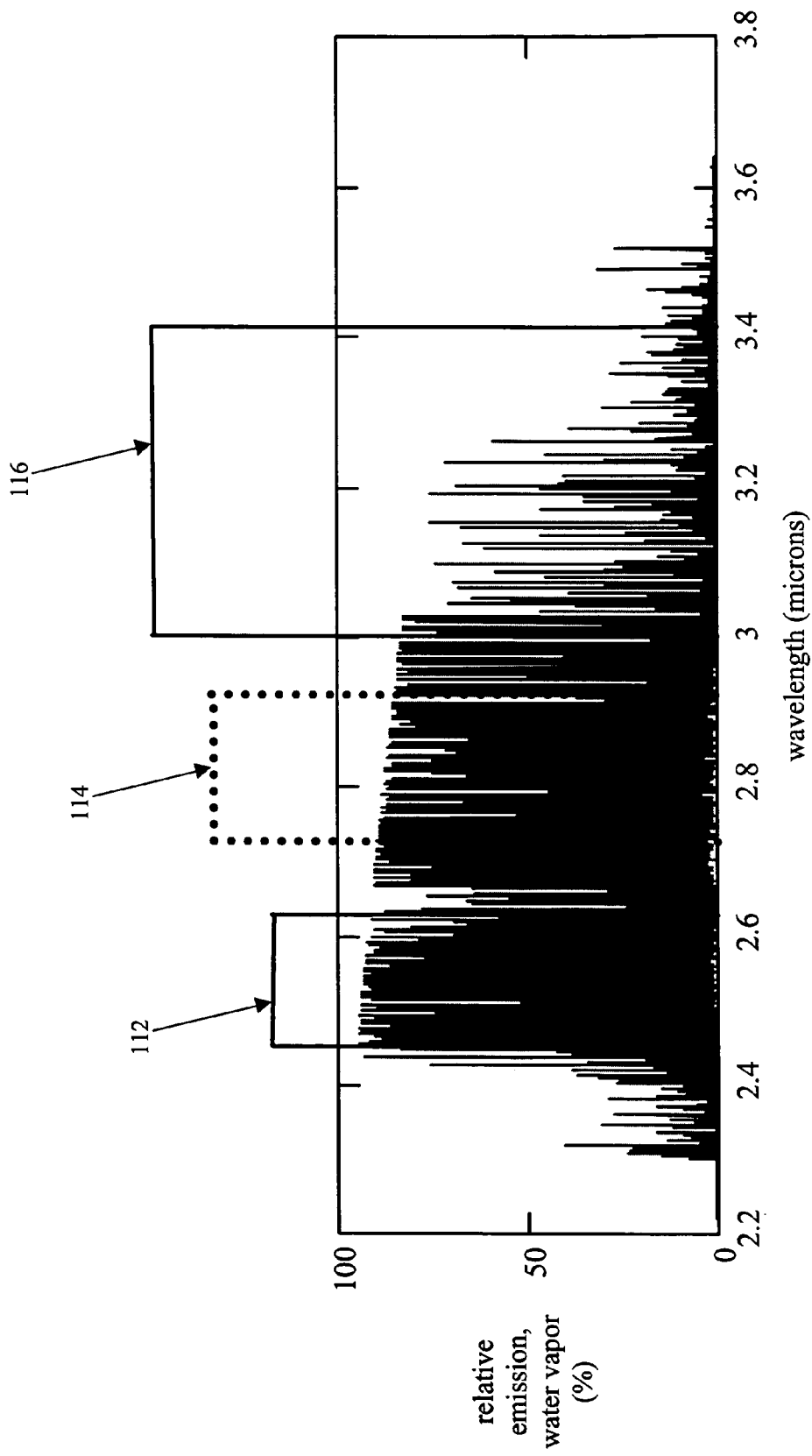
FIG. 7 illustrates yet another exemplary arrangement of first, second, and third regions in accordance with the principles of the present invention.

FIGS. 5, 6, and 7 each illustrate exemplary embodiments of such arrangements, with regard to the breadth of and relative signal strength from the first, second, and third regions 112, 114, and 116. As may be seen therein, the wavelength ranges of the first, second, and third regions 112, 114, and 116 are relatively broad. Rather than being arranged so as to include, exclude, or otherwise isolate a particular peak, each region as shown is broad enough that it includes multiple peaks. Likewise, it may be observed that the first, second, and third regions 112, 114, and 116 all receive significant amounts of infrared energy.

However, it is emphasized that the precise widths of the first, second, and third regions 112, 114, and 116 may vary considerably from embodiment to embodiment, even beyond the variation shown between FIGS. 5, 6, and 7, and that widths other than those shown may be equally suitable.

The particular arrangement of low and high cut-off wavelengths for the first, second, and third regions 112, 114, and 116 shown in FIG. 5—namely, a first region 112 extending from 2.427 to 3.120 microns, a second region 114 extending from 2.618 to 3.120 microns, and a third region 116 extending from 2.618 to 3.442 microns—has been determined to be effective in reliably indicating the presence of a fire while reliably excluding common false alarm sources. However, it is exemplary only, and other wavelength ranges may be equally suitable.

Nevertheless, the exemplary embodiment illustrated in FIG. 5 illustrates several potentially advantageous features. As shown therein, the first, second, and third regions 112, 114, and 116 partially overlap one another. Partial overlapping of the first, second, and third regions 112, 114, and 116 facilitates correlation of intensity measurements made for each of those three regions. This in turn facilitates data processing to exclude certain types of false alarms.

For example, with such an arrangement, it is possible not merely to determine whether infrared radiation at wavelengths emitted by a flame is present, but also to perform analysis using the signal strengths from the first, second, and third regions 112, 114, and 116. For example, mathematical correlation of the signals from the three regions can be used to determine whether the relative intensity of the infrared radiation that is present at various wavelengths is characteristic of an actual flame, as opposed to a false alarm source.

Correlation is well-known per se, and is not described further herein. However, it is noted that signal analysis is not limited only to correlation operations, and that other analysis in addition to or instead of correlation may be equally suitable.

Thus, with the use of overlapping regions a degree of spectral analysis of an infrared signal is enabled, above and beyond simple detection of infrared radiation. This facilitates increased false alarm resistance by providing greater accuracy in determining whether a given infrared source actually is a flame, or a non-flame false alarm source.

In addition, overlapping the first, second, and third regions 112, 114, and 116 may enable increased sensitivity for the detector 10, as compared with an embodiment having non-overlapped regions.

This is due to the fact that, for a water emission band of finite width, allowing the first, second, and third regions 112, 114, and 116 to overlap enables those regions to be made wider than if they did not overlap. This may be seen from a comparison of FIGS. 5 and 6. Although the total bandwidth included within the first, second, and third regions 112, 114, and 116 is the same for the embodiments of FIGS. 5 and 6, the first and third regions 112 and 116 both are substantially wider in FIG. 5 than in FIG. 6, even though the second region 114 is the same size in both.

Other factors being equal, as the wavelength range included in each of the first, second, and third regions 112, 114, and 116 increases, the amount of radiation present in each region also increases. Thus, the signals from the first, second, and third regions 112, 114, and 116 increase in strength. Consequently, a relatively weak infrared source, such as from a flame that is small, distant, partially obscured, etc., may still be detected.

However, although the use of overlapping first, second, and third regions 112, 114, and 116 may be advantageous in certain embodiments, it is exemplary only. Other arrangements may be equally suitable.

For example, FIG. 6 shows an exemplary embodiment of first, second, and third regions 112, 114, and 116. As in FIG. 5, those regions are distributed within the water emission band. However, while in FIG. 5 the regions overlap, in FIG. 6 those regions are contiguous, but do not overlap.

Similarly, FIG. 7 shows another exemplary embodiment of first, second, and third regions 112, 114, and 116 wherein those regions not only do not overlap but are separated from one another.

Either or both of the arrangements shown in FIGS. 6 and 7 may be suitable for certain embodiments of a flame detector in accordance with the principles of the present invention. In addition, other arrangements than those shown likewise may be suitable.

Returning to FIG. 5, wherein the first, second, and third regions 112, 114, and 116 are shown to overlap, in the exemplary embodiment illustrated therein the first and third regions 112 and 116 overlap one another partially, and the second region 114 is at least approximately defined by the overlap of the first and third regions 112 and 116.

In other words, the first region 112 has approximately the same high cut-off wavelength as the second region 114, and the third region 116 has approximately the same low cut-off wavelength as the second region 114. Thus, in the exemplary arrangement of FIG. 5, the first and third regions 112 and 116 each include essentially the entirety of the second region 114, and also extend beyond the second region 114.

Thus, in the Exemplary embodiment of FIG. 5, the second region 114 is defined approximately as occupying the bandwidth wherein the first and third regions 112 and 116 overlap.

As noted, overlapping of regions is exemplary only, and overlapping in the arrangement shown in FIG. 5 likewise is exemplary only. Moreover, when the first, second, and third regions 112, 114, and 116 overlap generally as shown in FIG. 5, the degree to which the various cut-off wavelengths of the first, second, and third regions 112, 114, and 116 correspond may vary.

For example, in a preferred embodiment, the high cut-off wavelength of the first region 112 corresponds with the high cut-off wavelength of the second region 114 to within 50% of the bandwidth of the second region, and the low cut-off wavelength of the third region 116 corresponds with the low cut-off wavelength of the second region 114 to within 50% of the bandwidth of the second region.

With reference to the exemplary embodiment of FIG. 5, the second region 114 extends from a low cut-off wavelength of 2.618 microns to a high cut-off wavelength of 3.120 microns, and so has a bandwidth of 0.502 microns. 50% of 0.502 microns is 0.251 microns. Thus, for the arrangement described above, the high cut-off wavelength of the first region 112 corresponds with the high cut-off wavelength of the second region 114 to within 0.251 microns, and the low cut-off wavelength of the third region 116 likewise corresponds with the low cut-off wavelength of the second region 114 to within 0.251 microns.

In another preferred embodiment, the high cut-off wavelength of the first region 112 corresponds with the high cut-off wavelength of the second region 114 to within 15% of the bandwidth of the second region, and the low cut-off wavelength of the third region 116 corresponds with the low cut-off wavelength of the second region 114 to within 15% of the bandwidth of the second region. Thus, for the exemplary arrangement shown in FIG. 5, the high cut-off wavelength of the first region 112 would correspond with the high cut-off wavelength of the second region 114 to within 0.075 microns, and the low cut-off wavelength of the third region 116 also would corresponds with the low cut-off wavelength of the second region 114 to within 0.075 microns.

In yet another preferred embodiment, the high cut-off wavelength of the first region 112 corresponds with the high cut-off wavelength of the second region 114 to within 5% of the bandwidth of the second region, and the low cut-off wavelength of the third region 116 corresponds with the low cut-off wavelength of the second region 114 to within 5% of the bandwidth of the second region. Thus, for the exemplary arrangement shown in FIG. 5, the high cut-off wavelength of the first region 112 would correspond with the high cut-off wavelength of the second region 114 to within 0.025 microns, and the low cut-off wavelength of the third region 116 also would corresponds with the low cut-off wavelength of the second region 114 to within 0.025 microns.

As shown in FIGS. 5, 6, and 7, the first, second, and third regions 112, 114, and 116 in combination cover a large portion of the water emission band illustrated therein.

As noted previously, the water emission band is defined herein for exemplary purposes to extend from wavelengths of 2.3 microns to wavelengths of 3.5 microns. In the embodiments shown in FIGS. 5 and 6, the first, second, and third regions 112, 114, and 116 combined extend from 2.427 microns to 3.442 microns, inclusive. Thus, they cover approximately 85% of the water emission band.

Note that arrangements having discrete the first, second, and third regions 112, 114, and 116 also may cover substantial portions of the water emission band, even though there may be gaps between the individual regions. For example, in the arrangement illustrated in FIG. 7, the first, second, and third regions 112, 114, and 116 combined cover approximately 70% of the water emission band.

For certain embodiments, sensing radiation in at least a substantial portion of the water emission band may be advantageous. For example, as the amount of the emission band for which radiation is sensed (that is, the amount covered by the combination of the first, second, and third regions 112, 114, and 116) increases, the total amount of radiation sensed also increases. Thus, the total signal strength in the first, second, and third regions 112, 114, and 116 increases. Consequently, a relatively weak infrared source, such as from a flame that is small, distant, partially obscured, etc., may still be detected. This effect is analogous to that previously described wherein increasing the width of the individual regions may increase the sensitivity of the detector 10.

In addition, covering a substantial portion of the water emission band may contribute to improved resistance to false alarms. For example, if the combination of first, second, and third regions 112, 114, and 116 covers the entire water emission band, a false alarm signal would have to match the emission characteristics for the entire water emission band in order to generate signals in the detector 10 similar to those from an actual flame. Thus, it may be possible to exclude as false alarms sources that may emit infrared radiation at wavelengths within the water emission band, but that do not emit infrared radiation with the same characteristic form as an actual flame (i.e. that emit radiation in only part of the water band, that emit strongly where the water band emits weakly, etc.).

Typically, increasing the total wavelength range encompassed within the first, second, and third regions 112, 114, and 116 decreases the likelihood that a non-flame source of infrared radiation will be falsely identified as a flame, other factors being equal.

In a preferred embodiment, the combination of the first, second, and third regions 112, 114, and 116 encompasses at least 50% of the bandwidth of the water emission band. Thus, assuming a water emission band extending from 2.3 to 3.5 microns in wavelength, the combination of the first, second, and third regions 112, 114, and 116 would encompass a total bandwidth of at least 0.6 microns.

In another preferred embodiment, the combination of the first, second, and third regions 112, 114, and 116 encompasses at least 85% of the bandwidth of the water emission band. Thus, assuming a water emission band extending from 2.3 to 3.5 microns in wavelength, the combination of the first, second, and third regions 112, 114, and 116 would encompass a total bandwidth of at least 1.02 microns.

In yet another preferred embodiment, the combination of the first, second, and third regions 112, 114, and 116 encompasses at least 95% of the bandwidth of the water emission band. Thus, assuming a water emission band extending from 2.3 to 3.5 microns in wavelength, the combination of the first, second, and third regions 112, 114, and 116 would encompass a total bandwidth of at least 1.14 microns.

However, such arrangements are exemplary only, and arrangements covering less than 50% of a characteristic water emission band may be equally suitable.

Returning to FIG. 4, as noted the detector 10 includes first, second, and third sensors 12, 14, and 16 sensitive to the first, second, and third regions 112, 114, and 116. Limiting the sensitivity of the first, second, and third sensors 12, 14, and 16 to the first, second, and third regions 112, 114, and 116 respectively may be accomplished for example by the use of band-pass filters.

Thus, the exemplary embodiment shown in FIG. 4 includes first, second, and third band-pass filters 18, 20, and 22 arranged to filter the radiation received by the first, second, and third sensors 12, 14, and 16 respectively. The specific low and high cut-off wavelengths for the first, second, and third regions 112, 114, and 116 thus may be imposed by using filters 18, 20, and 22 with appropriate low and high cut-off wavelengths.

For example, to produce first, second, and third regions 112, 114, and 116 as shown in FIG. 5, a detector 10 could incorporate a first band-pass filter 18 with a low cut-off wavelength of 2.427 microns and a high cut-off wavelength of 3.120 microns, a second band-pass filter 20 with a low cut-off wavelength of 2.618 microns and a high cut-off wavelength of 3.120 microns, and a third band-pass filter 22 with a low cut-off wavelength of 2.618 microns and a high cut-off wavelength of 3.442 microns.

As shown in FIG. 5 (as well as FIGS. 6 and 7), the first, second, and third regions 112, 114, and 116 are illustrated with sharp vertical cut-offs at their high and low ends. This is done for clarity. However, actual sensors and filters may not exhibit such perfect cut-offs. For example, the low and high cut-off wavelengths for a an actual first, second, or third band-pass filter 18, 20, or 22, and hence a particular first, second, or third region 112, 114, or 116, may correspond to the half-power cut-off wavelengths for that filter.

That is, the cut-off wavelengths referred to herein in practice may be defined in a variety of manners, such as corresponding to mid-points on transmission slopes, or other features, rather than necessarily being mathematically precise start and stop points. It is emphasized that perfect cut-offs are not required for the functionality of the present invention.

Indeed, the present invention is relatively insensitive to variations and errors in the shape of the cut-offs, their positions, and the widths of the first, second, and third regions 112, 114, and 116. This is due at least in part to the relatively large width of the first, second, or third region 112, 114, and 116.

As noted previously, the present invention does not rely on sensing a single peak in order to detect flames, but rather senses several regions, each of which includes multiple peaks and valleys. Thus, moderate shifts in the position of one of the three regions may cause that region to exclude some peaks, but may also cause it to include other peaks. Likewise, moderate changes in the width of a region may increase or decrease the signal strength somewhat, but may not change the overall operation of the detector 10, since a significant number of peaks—and hence a substantial signal—may still be present within that region.

Thus, it may not be necessary to have precision or accuracy in defining the cut-offs, positions, and bandwidths of the filters 18, 20, and 22. Consequently, if the requirements for the filters are relatively relaxed, expensive and/or complex manufacturing operations that may be necessary to produce extremely accurate and/or precise filters may be avoided with the present invention.

In addition to manufacturing issues, other factors may affect the effective wavelength ranges of actual filters. For example, the wavelengths of light that are passed by a given filter are to some extent dependent on the angle at which that light strikes the filter.

Typically, wavelength ranges cited for band-pass filters are for light incident normal to the plane of the filter. As the angle between the incident direction of the light and the normal axis of the filter—sometimes referred to as the off-axis angle—increases, the pass-band of the filter decreases in wavelength. Thus, radiation at wavelengths shorter than the nominal low cut-off wavelength may be passed, while radiation at wavelengths near but below the nominal high cut-off wavelength may not be passed. This "band shift" typically may be in the range of 2 to 3 percent for an off-axis angle of 45 degrees.

However, in the present invention the bandwidths of the first, second, and third regions 112, 114, and 116 are not required to match a particular peak. As noted above with regard to the filter cut-offs, moderate shifts in the position of the three regions may not be of great consequence. Thus, the sensitivity and false alarm resistance of a detector 10 in accordance with the principles of the present invention are both robust with regard to off-axis signals.

For certain embodiments, the detector 10 can be made still more robust in this regard by defining the first, second, and third regions 112, 114, and 116 such that the low cut-off wavelengths of all three regions are above the low end of the water emission band. For example, if the low cut-off wavelengths are all at least 2% to 3% of their width above the low end of the water emission band—approximately 2.3 microns as defined herein—then even with a downward shift of 2% to 3%, the first, second, and third regions 112, 114, and 116 still would be disposed entirely within the water emission band.

Such an arrangement is illustrated in FIGS. 5, 6, and 7. Therein, the lowest low cut-off wavelength is 2.427 microns, significantly more than 3% above the 2.3 micron defined lower end of the water emission band. Thus, the first, second, and third regions 112, 114, and 116 have some "play", so that the detector 10 may not be greatly affected by a moderate deviation in the wavelengths passed by the filters 18, 20, and 22.

However, such an arrangement is exemplary only.

An arrangement wherein moderate play is allowed in the first, second, and third regions 112, 114, and 116 as in the present invention may be contrasted with a conventional arrangement with a wavelength band aligned specifically with the carbon dioxide peak, wherein a relatively modest shift in wavelength (i.e. due to a manufacturing error in a filter, an off-axis signal, etc.) may result in that band being significantly misaligned with that peak.

Although as described above, the a detector 10 according to the principles of the present invention may have certain advantages with regard to the use of band-pass filters 18, 20, and 22 therewith, the use of such filters in defining the first, second, and third regions 112, 114, and 116 is exemplary only, and other arrangements may be equally suitable.

In addition, it may be advantageous in certain embodiment of the detector 10 for one or more of the first, second, and third regions 112, 114, and 116 to include a portion of the water emission band that is of relatively low intensity.

Such an arrangement may be seen for example in FIG. 5. Therein, the third region 116 extends up to its high cut-off wavelength of 3.442 microns. However, the intensity of the radiation at wavelengths above approximately 3.3 microns is, on average, much lower than that for shorter wavelengths. Similarly, the highest peaks above 3.3 microns are substantially smaller than those of shorter wavelength.

Such an arrangement may be advantageous, for example, in distinguishing between real flames and false alarms. With such an arrangement, not only must a false alarm signal radiate in the wavelengths characteristic to hot water vapor, it must not radiate in wavelengths where hot water vapor does not radiate strongly. The presence of significant levels of radiation at wavelengths where radiation would not be expected from an actual flame may be used as an indication that an actual fire is not present.

Although the above-mentioned arrangement is visually apparent, that is, wavelengths above about 3.3 microns have visibly less radiation, this may be further determined from processing, including but not limited to correction of the first, second, and third regions 112, 114, and 116. It may not be necessary for such intensity differences that are manifestly visible from a simple intensity plot.

Moreover, arrangements wherein the first, second, and/or third regions 112, 114, and 116 extend into low intensity portions of the water emission band and/or beyond the water emission band altogether are exemplary only. Other arrangements may be equally suitable.

Regardless of the manner in which they are made to be sensitive to the first, second, and third regions 112, 114, and 116, or the particular boundaries of those regions, the first, second, and third sensors 12, 14, and 16 generate first, second, and third signals representative of infrared radiation in the first, second, and third regions 112, 114, and 116.

The first, second, and third sensors 12, 14, and 16 are in communication with a processor 24. The processor 24 receives the first, second, and third signals, and processes those signals to determine whether they are indicative of a flame.

As previously noted, the processing performed by the processor 24 may include correlation of the first, second, and third signals. However, this is exemplary only, and processing other than or in addition to such correlation may be equally suitable. Signal processing is known per se, and is not further described herein.

If the processor 24 determines that the first, second, and third signals are indicative of a flame, the processor 24 generates an alarm signal.

As shown in FIG. 4, the processor 24 may be in communication with an alarm 28. In the exemplary embodiment illustrated, the alarm signal generated by the processor 24 activates the alarm 28, which then indicates the presence of a flame in the area monitored by the detector 10.

For purposes of simplicity, a simple, discrete alarm 28 is illustrated in FIG. 4. Such an alarm 28 might include audible bells or tones, pre-recorded announcements, warning lights, etc. However, such an arrangement is exemplary only.

Although in FIG. 4 the alarm 28 is shown as an audible warning device, the alarm 28 may include substantially any apparatus that can record, announce, and/or respond to an indication of a flame. In particular, fire suppression systems, including but not limited to carbon dioxide extinguishers, sprinkler systems, halon dischargers, etc., may be considered to be alarms for the purposes of this invention. Thus, the alarm signal from the processor 24 could be transmitted to a carbon dioxide extinguisher (for example), in addition to or instead of a visible or audible alarm.

In addition, the alarm signal generated by the processor 24 will not necessarily be sent to a single discrete alarm device. For certain embodiments, it may be advantageous to send the alarm signal to several separate devices, i.e. a fire suppression system and a warning klaxon.

Similarly, it may be advantageous to send the alarm system to a central processor, a network, etc. It is in particular noted that, although the alarm 28 is shown a short distance from the detector 10, in practice the alarm 28 may be located at some considerable distance. Indeed, the alarm 28 will not necessarily be located inside the area that is monitored by the detector 10, though for certain embodiments it may be.

In addition, although the alarm 28 is shown as a separate device from the detector 10, the detector 10 itself may incorporate one or more alarms 28 therein, in addition to or in place of any external alarms 28.

Alarms are known per se, and are not further described herein.

Infrared radiation such as that emitted by hot gases may be susceptible to absorption by other gases. For example, infrared radiation with a wavelength of approximately 4.4 microns, corresponding to the emission peak sensed by conventional flame detectors, is readily absorbed by carbon dioxide that may be present between the flame and the conventional detector.

Conventionally, this has been known to cause difficulties, since both carbon dioxide and hydrocarbon vapors are common in certain environments wherein flame detection may be desirable. For example, carbon dioxide may be introduced into an area where a flame is present in order to extinguish that flame. However, absorption of the 4.4 micron peak by the carbon dioxide suppressant can obscure the 4.4 micron radiation emitted by the flame itself. Thus, it may be difficult to determine whether and when a flame has been extinguished.

However, carbon dioxide does not absorb substantial amounts of infrared radiation emitted by hot water, particularly wavelengths in the range of 2.3 to 3.5 microns. Thus, a detector 10 in accordance with the principles of the present invention may be highly tolerant of the presence of carbon dioxide.

The presence of water vapor between a flame and a detector 10 in accordance with the principles of the present invention can absorb infrared radiation in the range of 2.3 to 3.5 microns, corresponding to the infrared water emission band referred to herein.

Figure 8:
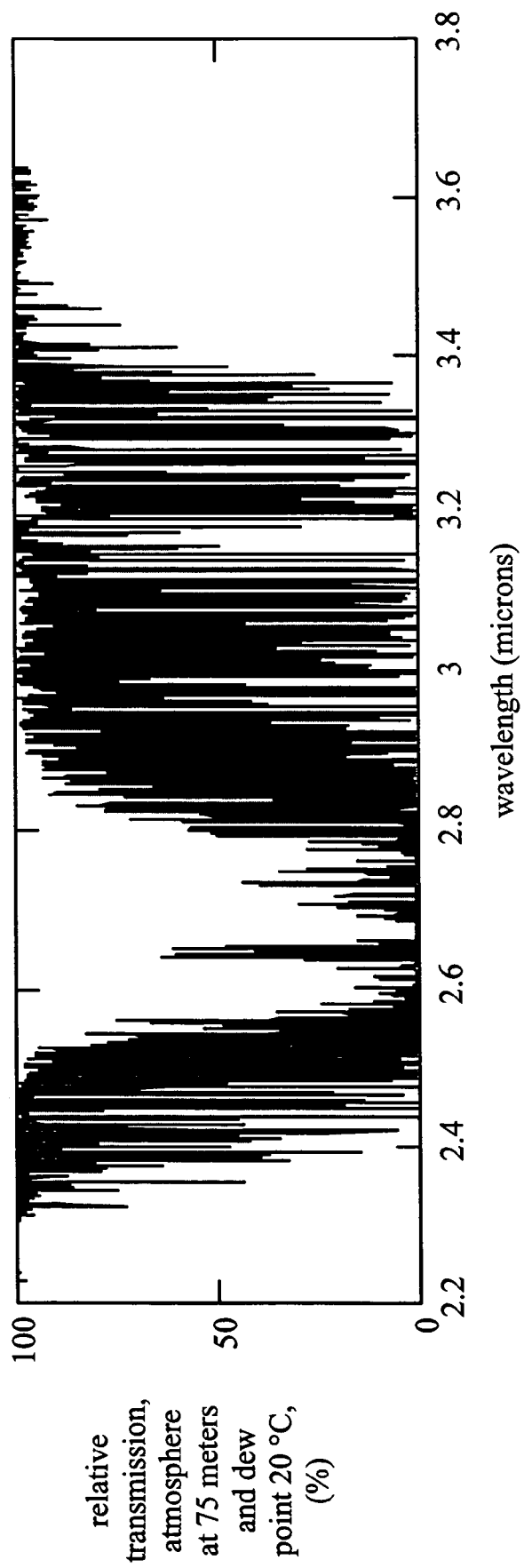
FIG. 8 shows a portion of an exemplary atmospheric infrared transmission spectrum for water, as known from the prior art.

However, the absorption spectrum of cool water vapor does not correspond precisely to the emission spectrum of the hot water vapor associated with a flame. This may be seen by a comparison of FIGS. 2 and 8. Although infrared radiation at some of the wavelengths emitted by water vapor, as illustrated in FIG. 2, may be absorbed by atmospheric water vapor as shown in FIG. 8, the absorption does not entirely match the emission. Thus, when the full range of wavelengths present in the water emission band (and the first, second, and third regions 112, 114, and 116 sensed by the detector 10) are considered, at least some portion of the characteristic infrared radiation signature of hot water vapor may pass through a region that includes cool water vapor therein.

Consequently, although atmospheric water vapor may affect the "shape" of the infrared spectrum that reaches a detector 10 in accordance with the principles of the present invention, concentrations of water vapor typically found will not necessarily significantly degrade the ability of the detector to detect flames, or distinguish between flames and false alarms.

At least small quantities of water vapor are present in a great many environments. Thus, at least low levels of absorption may be expected in some circumstances. However, this fact, combined with the imperfect absorption of the full water emission band, may be utilized advantageously to determine, at least approximately, the distance between a flame and the detector 10.

As indicated above, the presence of water vapor between the detector 10 and a flame typically modifies the characteristic infrared spectrum emitted by the hot water vapor associated with a flame. The degree to which the intervening water vapor alters the infrared radiation incident on the detector 10—that is, the amount of infrared radiation absorbed at various wavelengths—varies based on the amount of intervening water vapor. Other factors being equal, the more intervening water vapor, the greater the change to the emission spectrum.

Factors other than the total quantity of intervening water vapor may have some effect on the changes to the emission spectrum. However, the changes are to a substantial degree a function of the amount of intervening water vapor. That is, a given amount of total water vapor produces generally similar effects to the emission spectrum under a wide range of conditions. Thus, by interpreting the changes between an "ideal" infrared emission spectrum unmodified by intervening water vapor, and an actual infrared emission spectrum as sensed, the total quantity of water vapor between the flame producing that emission spectrum and the detector 10 can be determined.

In summary, the quantity of intervening water vapor can be determined by the degree to which the infrared emission spectrum deviates from an ideal value. Thus, the intensity of infrared radiation in the first, second, and third regions 112, 114, and 116 can be used to determine the amount of water vapor present between a detector 10 and a flame.

The total quantity of water present in a line-of-sight path between the flame and the detector 10 depends on the length of that path and the density of water vapor along it. Assuming a uniform density of water, the total amount of water vapor equals the path length times the density. Thus, the path length can be determined from the total quantity of intervening water vapor, which in turn can be determined from analysis of the changes to the emission spectrum.

In order to determine the density of water vapor present, a flame detector 10 in accordance with the principles of the present invention may include a fourth sensor 26 for detecting water vapor, in communication with the processor 24. The fourth sensor 26 generates a fourth signal indicative of the density of water vapor present. The processor 24 receives this signal, and uses it in conjunction with the first, second, and third signals to determine a distance to the flame.

A variety of sensors may be suitable for use as the fourth sensor. For example, sensors for measuring relative humidity are in common use. Moisture sensors are known per se, and are not further described herein.

It is noted that in practice, determining the total quantity of water present by measuring, for example, relative humidity, may not be entirely accurate or highly precise. For example, if a detector 10 in accordance with the principles of the present invention is relied upon to protect a relatively large area, i.e. one extending several hundred feet from the detector 10, the humidity may not be perfectly constant over such a distance. In addition, factors other than water vapor in the air may affect the degree to which the emission spectrum from a flame's hot water vapor is modified, including but not limited to temperature, and the presence of substances other than water.

For this and possibly other reasons, measurements of distance between the detector 10 and a given flame may not necessarily have extremely high precision.

However, although certain embodiments of a flame detector 10 in accordance with the principles of the present invention may be adapted to provide high-precision measurements of the distance to a particular flame, for some embodiments such a feature may not be necessary.

For example, FIG. 4 shows a first flame 30 at a first distance 34 that is relatively close to the detector 10. FIG. 4 also shows a second flame 32 at a second distance 36 that is relatively far from the detector 10. The second distance 36 is greater than the first distance 34.

Not all flames that are visible in an area protected by a given flame detector 10 necessarily are in that area. Moreover not all flames in that area represent a threat. It is not uncommon for known, acceptable flames to be present either in the protected area or with line of sight to it.

For example, petroleum operations often include stack flares for burning off waste gases. These flares can be extremely large, and may be visible for many miles. Conventionally, care must be taken to exclude stack flares from the field of view of flame detectors over a large area surrounding the stack flares, to avoid false alarms due to this known phenomenon.

However, a flame detector 10 in accordance with the principles of the present invention may distinguish between two flames at different distances, even if those distances are not measured precisely.

For example, such a detector 10 might be tasked to protect an area extending out to a distance 300 feet. With reference to FIG. 4, consider the difference between a known first flame 30 that might be present at a first distance 34 of 50 feet, and a second flame 32 that might be present at a second distance 36 of 200 feet. Such an arrangement might occur if, for example, a gas welding operation were being performed within the protected area (in this instance, represented by the first flame 30 at a first distance 34 of 50 feet).

Conventionally, in order to introduce a known flame into a protected area, a conventional flame detector protecting that area would have to be disabled. Thus, the entire area might be unprotected while the aforementioned gas welding operation was taking place.

However, with a flame detector 10 in accordance with the principles of the present invention, even if the precision of distance measurements is only to within plus or minus 50%, protection of at least a portion of the nominally protected area may be enabled even during the gas welding operation.

With plus or minus 50% precision, the first flame 30 at the first distance 34 of 50 feet might be identified as being somewhere between 25 and 75 feet away from the detector 10. The detector 10 could be instructed to ignore signals in the first, second, and third regions 112, 114, and 116 of infrared radiation that otherwise would be considered indicative of a flame, if those signals were identified as originating 25 to 75 feet from the detector 10. In such a case, if the second flame 32 appeared at a second distance 36 of 200 feet—which with plus or minus 50% precision could be identified as being between 100 and 300 feet away—the detector 10 could still trigger an alarm.

Moreover, even if absolute distances cannot be determined at all, but only relative distances, this also may be advantageous for certain embodiments.

For example, a detector 10 might be tasked to protect an area extending out to a distance 150 feet. With reference to FIG. 4, consider the difference between a first flame 30 that might be present at a first distance 34 of 100 feet, and a known second flame 32 such as a stack flare that might be present at a second distance 36 of 1000 feet.

Regardless of the degree to which intervening water (or other effects) would modify the infrared emission spectrum of the first flame 30, the changes to the infrared emission spectrum of the second flame 32 may be expected to be significantly greater. Thus, even if the actual distance to the second flame 32 is not known, or is known imprecisely, analysis of the infrared radiation in the first, second, and third regions 112, 114, and 116 from the second flame 32 can be used to determine that the second flame 32 is far enough away as to be outside the protected area, and that no alarm is necessary.

Similarly, analysis of the infrared radiation in the first, second, and third regions 112, 114, and 116 from the first flame 30 can be used to determine that the first flame 30 is close enough that, assuming any other requirements are met, an alarm signal should be sent.

Thus, even if precise distances are not determined, a flame detector 10 in accordance with the principles of the present invention may still advantageously determine approximate distances, and/or relative distances.

Thus, distance determination may be possible and useful even for embodiments of a detector 10 that do not include a fourth sensor 26 for measuring the quantity of water vapor present. The amount of water vapor present might be approximated and pre-programmed, for example, so as to yield approximate distances. Alternatively, the detector 10 might be adapted only to determine relative distances, relying on anticipated differences between the infrared emission spectra of distant and nearby flames.

The above specification, examples and data provide a complete description of the manufacture and use of the composition of the invention. Since many embodiments of the invention can be made without departing from the spirit and scope of the invention, the invention resides in the claims hereinafter appended.

I claim:

1. Apparatus for detecting infrared emissions of hot water vapor comprising:

a first sensor sensitive to a first region of a characteristic infrared water emission band extending from 2.427 μm to 3.120 μm, said first sensor generating a first signal representative of infrared radiation in said first region;

a second sensor sensitive to a second region of said characteristic infrared water emission band extending from 2.618 μm to 3.120 μm, said second sensor generating a second signal representative of infrared radiation in said second region;

a third sensor sensitive to a third region of said characteristic infrared water emission hand extending from 2.618 μm to 3.442 μm, said third sensor generating a third signal representative of infrared radiation in said third region;

a processor in communication with said first, second, and third sensors so as to receive said first, second and third signals;

said processor generating an alarm signal when said first, second, and third signals indicate presence of water vapor emissions.

2. The apparatus according to claim 1, wherein:
at least two of said first, second, and third regions have at least a portion of said characteristic infrared water emission band in common with one another.

3. The apparatus according to claim 1, wherein:
said first region comprises at least a portion of said second region, a low cut-off wavelength of said first region being lower than a low cut-off wavelength of said second region; and
said third region comprises at least a portion of said second region, a high cut-off wavelength of said third region being higher than a high cut-off wavelength of said second region.

4. The apparatus according to claim 3, wherein:
a high cut-off wavelength of said first region corresponds with a high cut-off wavelength of said second region to within 50% of a bandwidth of said second region; and
a low cut-off wavelength of said third region corresponds with a low cut-off wavelength of said second region to within 50% of a bandwidth of said second region.

5. The apparatus according to claim 3, wherein:
a high cut-off wavelength of said first region corresponds with a high cut-off wavelength of said second region to within 15% of a bandwidth of said second region; and
a low cut-off wavelength of said third region corresponds with a low cut-off wavelength of said second region to within 15% of a bandwidth of said second region.

6. The apparatus according to claim 3, wherein;
a high cut-off wavelength of said first region corresponds with a high cut-off wavelength of said second region to within 5% of a bandwidth of said second region; and
a low cut-off wavelength of said third region corresponds with a low cut-off wavelength of said second region to within 5% of a bandwidth of said second region.

7. The apparatus according to claim 1, wherein:
a combination of said first, second, and third regions comprises at least 50% of said characteristic infrared water emission band.

8. The apparatus according to claim 1, wherein:
a combination of said first, second, and third regions comprises at least 85% of said characteristic infrared water emission band.

9. The apparatus according to claim 1, wherein:
a combination of said first, second, and third regions comprises at least 95% of said characteristic infrared water emission band.

10. The apparatus according to claim 1, wherein:
said flame burns substantially carbon-free, hydrogen-bearing fuel.

11. The apparatus according to claim 1, wherein:
said first, second, and third sensors are insensitive to a presence of carbon dioxide between said sensors and said flame.

12. The apparatus according to claim 1, wherein:
said first, second, and third sensors are insensitive to a presence of hydrocarbon vapors between said sensors and said flame.

13. An apparatus for detecting flame, comprising:
a first sensor sensitive to a first region of a characteristic infrared water emission band, said first sensor generating a first signal representative of infrared radiation in said first region;
a second sensor sensitive to a second region of said characteristic infrared water emission band, said second sensor generating a second signal representative of infrared radiation in said second region;
a third sensor sensitive to a third region of said characteristic infrared water emission band, said third sensor generating a third signal representative of infrared radiation in said third region;
a processor in communication with said first, second, and third sensors so as to receive said first, second and third signals;
said processor generating an alarm signal when said first, second, and third signals are indicative of flame;
said processor discriminates a distance to said flame based on said first, second, and third signals.

14. The apparatus according to claim 13, wherein:
said processor discriminates said distance to said flame based on said first, second, and third signals and a fourth signal representative of a concentration of moisture between said apparatus and said flame.

15. The apparatus according to claim 14, further comprising:
a fourth sensor sensitive to moisture between said apparatus and said flame, said fourth sensor generating said fourth signal, said fourth sensor being in communication with said processor.

16. The apparatus according to claim 13, wherein:
said processor does not generate said alarm signal based on said distance to said flame.

17. An apparatus for detecting flame, comprising:
a first sensor sensitive to a first region of a characteristic infrared water emission band, said first sensor generating a first signal representative of infrared radiation in said first region;
a second sensor sensitive to a second region of said characteristic infrared water emission band, said second sensor generating a second signal representative of infrared radiation in said second region;
a third sensor sensitive to a third region of said characteristic infrared water emission band, said third sensor generating a third signal representative of infrared radiation in said third region;
a processor in communication with said first, second, and third sensors so as to receive said first, second and third signals;
said processor generating an alarm signal when said first, second, and third signals are indicative of flame;
said first, second, and third regions are defined such that for a fire, a ratio of energy in said second region to energy in said first region is less than 1:1, and a ratio of energy in said second region to energy in said third region is less than 1:1.

18. Method of detecting flame, comprising:
detecting infrared radiation in a first region of an emission band including infrared emissions characteristic of hot water vapor and extending between 2.427 μm and 3.120 μm;
detecting infrared radiation in a second region of said emission band extending between 2.618 μm and 3.120 μm;
detecting infrared radiation in a third region of said emission band extending between 2.618 μm and 3.442 μm;
determining a presence of water vapor when significant amounts of infrared radiation are detected in said first second, and third regions.

19. The method according to claim 18, wherein:
at least two of said first, second, and third regions have at least a portion of said characteristic infrared water emission band in common with one another.

20. The method according to claim 18, wherein:
said first region comprises at least a portion of said second region, a low cut-off wavelength of said first region being lower than a low cut-off wavelength of said second region; and
said third region comprises at least a portion of said second region, a high cut-off wavelength of said third region being higher than a high cut-off wavelength of said second region.

21. The method according to claim 20, wherein:
a high cut-off wavelength of said first region corresponds with a high cut-off wavelength of said second region to within 50% of a bandwidth of said second region; and
a low cut-off wavelength of said third region corresponds with a low cut-off wavelength of said second region to within 50% of a bandwidth of said second region.

22. The method according to claim 20, wherein:
a high cut-off wavelength of said first region corresponds with a high cut-off wavelength of said second region to within 15% of a bandwidth of said second region; and
a low cut-off wavelength of said third region corresponds with a low cut-off wavelength of said second region to within 15% of a bandwidth of said second region.

23. The method according to claim 20, wherein:
a high cut-off wavelength of said first region corresponds with a high cut-off wavelength of said second region to within 5% of a bandwidth of said second region; and
a low cut-off wavelength of said third region corresponds with a low cut-off wavelength of said second region to within 5% of a bandwidth of said second region.

24. The method according to claim 18, wherein:
a combination of said first, second, and third regions comprises at least 50% of said characteristic infrared water emission band.

25. The method according to claim 18, wherein:
a combination of said first, second, and third regions comprises at least 85% of said characteristic infrared water emission band.

26. The method according to claim 18, wherein:
a combination of said first, second, and third regions comprises at least 95% of said characteristic infrared water emission band.

27. The method according to claim 18, wherein:
said flame burns substantially carbon-free, hydrogen-bearing fuel.

28. A method of detecting flame, comprising:
detecting infrared radiation in a first region of a characteristic infrared water emission band;
detecting infrared radiation in a second region of said characteristic infrared water emission band;
detecting infrared radiation in a third region of said characteristic infrared water emission band;
determining a presence of flame from relative intensities of said infrared radiation in said first, second, and third regions;
discriminating a distance to said flame using said infrared radiation in said first, second, and third regions.

29. The method according to claim 28, further comprising:
determining a concentration of moisture along an optical path to said flame; wherein
said distance to said flame is discriminated from said infrared radiation in said first, second, and third regions and said moisture concentration.

30. A method of detecting flame, comprising:
detecting infrared radiation in a first region of a characteristic infrared water emission band;
detecting infrared radiation in a second region of said characteristic infrared water emission band;
detecting infrared radiation in a third region of said characteristic infrared water emission band;
determining a presence of flame from relative intensities of said infrared radiation in said first, second, and third regions;
said first, second, and third regions are defined such that for a fire, a ratio of energy in said second region to energy in said first region is less than 1:1, and a ratio of energy in said second region to energy in said third region is less than 1:1.

31. Method of discriminating distance to a flame, comprising:
detecting infrared radiation in a first region of a characteristic infrared water emission band;
detecting infrared radiation in a second region of said characteristic infrared water emission band;
detecting infrared radiation in a third region of said characteristic infrared water emission band;
discriminating a distance to said flame from relative intensities of infrared radiation in said first, second, and third regions.

32. The method according to claim 31, further comprising:
determining a concentration of moisture along an optical path to said flame; wherein
said distance to said flame is discriminating using said infrared radiation in said first, second, and third regions and said moisture concentration.

* * * * *

(12) EX PARTE REEXAMINATION CERTIFICATE (7611th)
United States Patent
King

(10) Number: US 7,119,697 C1
(45) Certificate Issued: Jul. 13, 2010

(54) HYDROGEN FIRE DETECTION SYSTEM AND METHOD

(75) Inventor: John D. King, Roseville, MN (US)

(73) Assignee: Detector Electronics Corporation, Bloomington, MN (US)

Reexamination Request:
No. 90/010,749, Nov. 25, 2009

Reexamination Certificate for:
Patent No.: 7,119,697
Issued: Oct. 10, 2006
Appl. No.: 10/913,276
Filed: Aug. 6, 2004

Related U.S. Application Data

(60) Provisional application No. 60/550,501, filed on Mar. 5, 2004.

(51) Int. Cl.
*G08B 17/12* (2006.01)

(52) U.S. Cl. .................. 340/578; 340/511; 340/577; 702/135

(58) Field of Classification Search .............. 340/578
See application file for complete search history.

(56) References Cited

U.S. PATENT DOCUMENTS

| | | |
|---|---|---|
| 3,609,364 A | 9/1971 | Paine |
| 4,206,454 A | 6/1980 | Schapira et al. |
| 4,455,487 A | 6/1984 | Wendt |
| 5,311,167 A | 5/1994 | Plimpton et al. |
| 5,339,070 A | 8/1994 | Yalowitz et al. |
| 5,473,162 A | 12/1995 | Busch et al. |
| 5,625,342 A | 4/1997 | Hall et al. |
| 5,671,914 A | 9/1997 | Kalkhoran et al. |
| 5,677,532 A | 10/1997 | Duncan et al. |
| 5,726,632 A | 3/1998 | Barnes et al. |
| 6,373,393 B1 | 4/2002 | Matsukuma et al. |
| 6,518,574 B1 | 2/2003 | Castleman |

*Primary Examiner*—Christina Y Leung

(57) ABSTRACT

To detect flames burning carbon-free hydrogen-bearing fuels, first, second, and third sensors sense first, second and third regions of an infrared water emission band, and generate first, second, and third signals. A processor generates an alarm when the sensors indicate flame. The first region low cut-off wavelength may be lower than the second region low cut-off wavelength. The third region high cut-off wavelength may be higher than the second region high cut-off wavelength. The combined regions may include nearly the entire water emission band. The processor may discriminate distances to flames using the sensor signals. A fourth sensor may sense moisture concentration, and the processor may discriminate distances based thereon. The regions may be defined such that for a fire, all three regions receive substantial energy, with second region to first region energy ratio less than 1:1 and a second region to third region energy ratio less than 1:1.

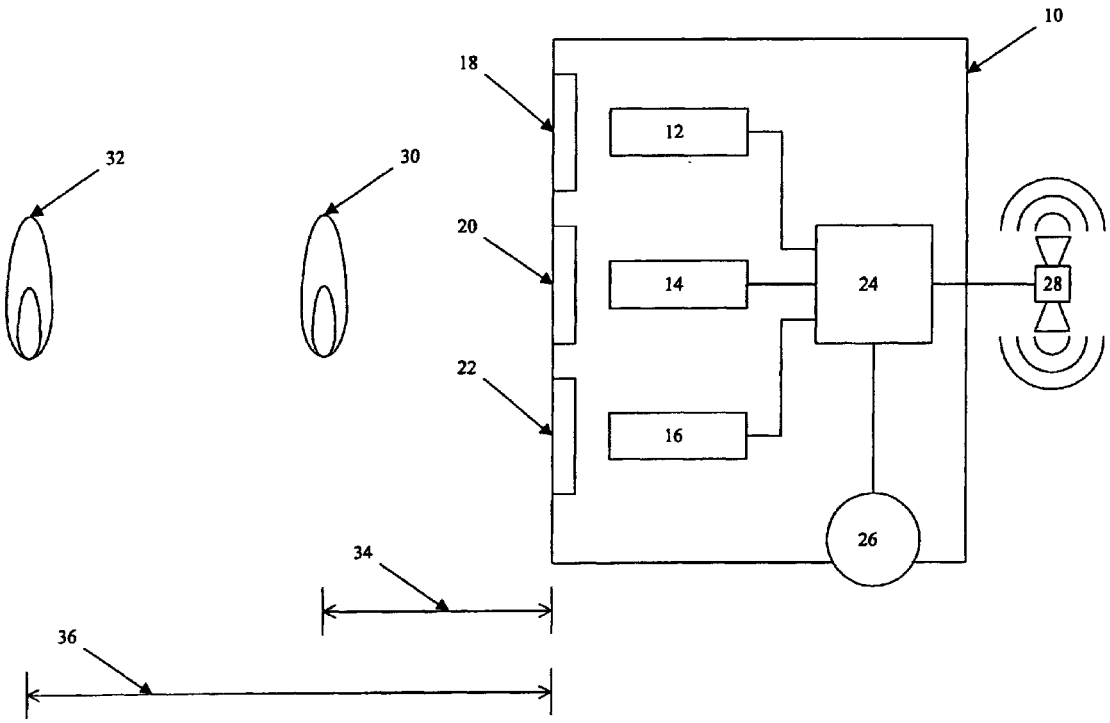

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1 and 18 is confirmed.

Claims 2-17 and 19-32 were not reexamined.

* * * * *